(12) United States Patent
Epshetsky

(10) Patent No.: US 8,328,201 B2
(45) Date of Patent: Dec. 11, 2012

(54) PUMPING SEAL ASSEMBLY WITH ANGLED SPRING

(75) Inventor: Yefim Epshetsky, Schaumberg, IL (US)

(73) Assignee: Aktiebolaget SKF, Göteborg (SE)

( * ) Notice: Subject to any disclaimer, the term of this patent is extended or adjusted under 35 U.S.C. 154(b) by 275 days.

(21) Appl. No.: 12/821,629

(22) Filed: Jun. 23, 2010

(65) Prior Publication Data
US 2011/0316235 A1    Dec. 29, 2011

(51) Int. Cl.
*F16J 15/32* (2006.01)

(52) U.S. Cl. .................... 277/551; 277/557; 277/559

(58) Field of Classification Search .......... 277/551, 277/559, 553–557, 572, 576, 577
See application file for complete search history.

(56) References Cited

U.S. PATENT DOCUMENTS

| | | | | |
|---|---|---|---|---|
| 3,640,542 A * | 2/1972 | Mowat et al. | ................. | 277/559 |
| 3,790,180 A * | 2/1974 | Heyn et al. | ................. | 277/559 |
| 3,927,600 A * | 12/1975 | Peisker | ................. | 409/84 |
| 3,929,340 A * | 12/1975 | Peisker | ................. | 277/559 |
| 4,094,519 A * | 6/1978 | Heyn et al. | ................. | 277/559 |
| 4,588,195 A * | 5/1986 | Antonini et al. | ................. | 277/504 |
| 4,616,836 A * | 10/1986 | Drygalski et al. | ................. | 277/552 |
| 4,739,998 A * | 4/1988 | Steusloff et al. | ................. | 277/309 |
| 4,770,425 A * | 9/1988 | Colanzi et al. | ................. | 277/353 |
| 5,350,181 A * | 9/1994 | Horve | ................. | 277/559 |
| 5,860,656 A * | 1/1999 | Obata et al. | ................. | 277/559 |
| 6,173,961 B1 * | 1/2001 | Martin | ................. | 277/353 |

* cited by examiner

*Primary Examiner* — Vishal Patel
(74) *Attorney, Agent, or Firm* — Mark A. Ussai

(57) ABSTRACT

A seal assembly is for sealing a space between a housing and a shaft rotatable about a central axis. The seal assembly includes a seal body connectable with the housing and having an inner circumferential sealing surface. The sealing surface has opposing axial ends and is slidably contactable with the shaft outer surface to define a sealing interface. An annular biasing member, preferably a garter spring, is disposed about a portion of the seal body and has a centerline. The biasing member exerts a biasing force directed radially inwardly toward the centerline, such that the seal exerts a contact pressure on the shaft. Further, the biasing member is angularly positioned on the seal body such that the contact pressure extends axially along the shaft axis to direct substances entering the sealing interface toward a proximal axial end of the sealing surface when the shaft rotates about the central axis.

14 Claims, 7 Drawing Sheets

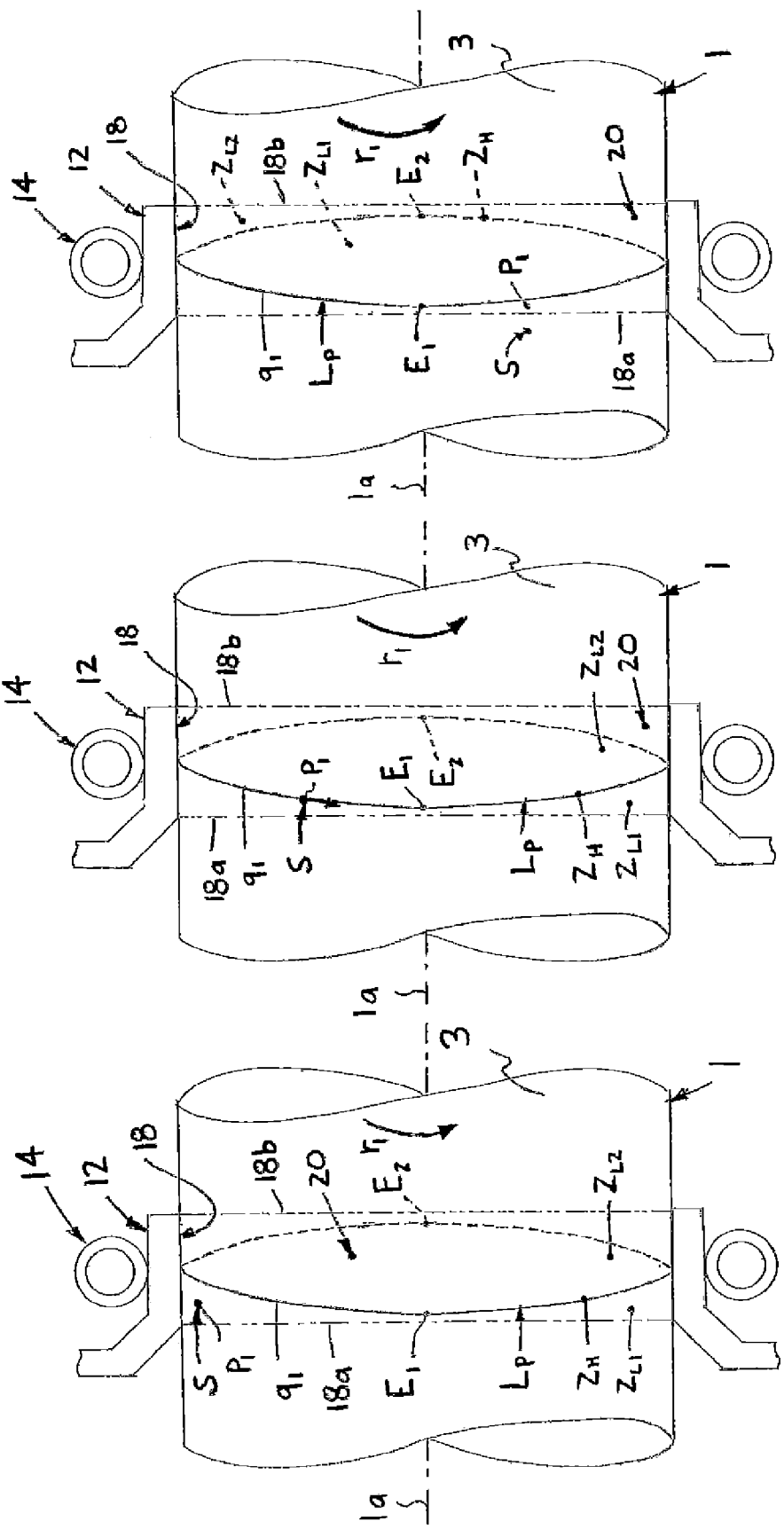

PUMPING SEAL ASSEMBLY WITH ANGLED SPRING

The present invention relates to seals, and more particularly to radial seals for sealing a space about the rotatable shaft.

Radial shaft seals are generally known and typically include a seal member with an inner circumferential "sealing surface", which may be provided by an annular lip or a cylindrical portion of the seal body, that is engageable with the exterior surface of a shaft. As the shaft rotates within the seal, the sealing surface remains in sliding contact with the shaft outer surface to prevent the migration of substances (e.g., oil, debris particles) through a sealed space. Typically, to provide sufficient sealing pressure and to account for variations in the shaft and seal dimensions and/or misalignments, such seal assemblies are often provided with a biasing member (e.g., a garter spring) to "force" the seal member into engagement with the shaft.

Further, some seal assemblies are provided with a seal member having a formed surface (e.g., sine wave-shaped) that creates a "pumping effect" to remove any substances that become disposed between the sealing surface and the shaft surface. Typically, such pumping seal assemblies are more costly to manufacture compared with a conventional "non-pumping" seal assembly due to the additional fabrication necessary to create the pumping effect.

SUMMARY OF THE INVENTION

In one aspect, the present invention is a seal assembly for sealing a space between a shaft and a housing, the shaft being rotatable about a central axis. The seal assembly basically comprises a seal body connectable with the housing and having a centerline and an inner circumferential sealing surface extending about the centerline. The sealing surface has opposing axial ends and is slidably contactable with the shaft outer surface so as to define a sealing interface. A generally annular biasing member is disposed about a portion of the seal body and has a centerline, the biasing member being configured to exert a biasing force directed generally radially inwardly toward the centerline, such that the seal exerts a contact pressure on the shaft. Further, the biasing member is angularly positioned on the seal body such that the contact pressure extends at least partially axially along the shaft axis so as to direct a substance entering the sealing interface toward a proximal one of the two axial ends of the sealing surface when the shaft rotates about the central axis.

In another aspect, the present invention is a method of pumping fluid with a seal assembly for sealing a space between a rotatable shaft and a housing. The pumping method basically comprises the steps of: providing a seal assembly including a generally annular seal body and a generally annular biasing member, the seal body having a centerline and an inner circumferential sealing surface with opposing axial ends, the biasing member having a centerline and being configured to exert a biasing force radially inwardly toward the centerline; mounting the seal body about the shaft such that the sealing surface is engaged with an outer circumferential surface of the shaft so as to define a sealing interface; mounting the biasing member about a portion of the seal body such that the biasing member is angularly positioned on the body, the biasing member exerting the biasing force on the seal body such that the seal body exerts a contact pressure on the shaft, the contact pressure extending at least partially along the shaft axis; and rotating the shaft within the seal such that the contact pressure directs any fluid entering the sealing interface toward a proximal one of the two axial ends of the sealing surface.

In a further aspect, the present invention is again a seal assembly for sealing a space between a shaft and a housing, the shaft being rotatable about a central axis. The seal assembly comprises a seal body connectable with the housing and having a centerline and an inner circumferential sealing surface extending about the centerline, the sealing surface being slidably contactable with the shaft outer surface. A generally annular biasing member is disposed about a portion of the seal body and has a centerline, the biasing member being configured to exert a biasing force directed generally radially inwardly toward the centerline such that the seal body exerts a contact pressure on the shaft. The biasing member is angularly positioned on the seal body such that the biasing member centerline either intersects the shaft axis or is substantially skewed with respect to the shaft axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 4A-4C, collectively FIG. 4, are each a reduced view of FIG. 3 depicting a separate point in a process of expelling a substance S located adjacent to a first end of a sealing surface from a sealing interface as a shaft rotates in a first direction;

FIG. 5, are each a reduced view of FIG. 3 depicting a separate point in a process of expelling a substance S located adjacent to the sealing surface first end from the sealing interface as the shaft rotates in a second direction;

FIG. 6, are each a reduced view of FIG. 3 depicting a separate point in a process of expelling a substance S located adjacent to a second end of the sealing surface from the sealing interface as the shaft rotates in the first direction;

DETAILED DESCRIPTION OF THE INVENTION

Figure 1:
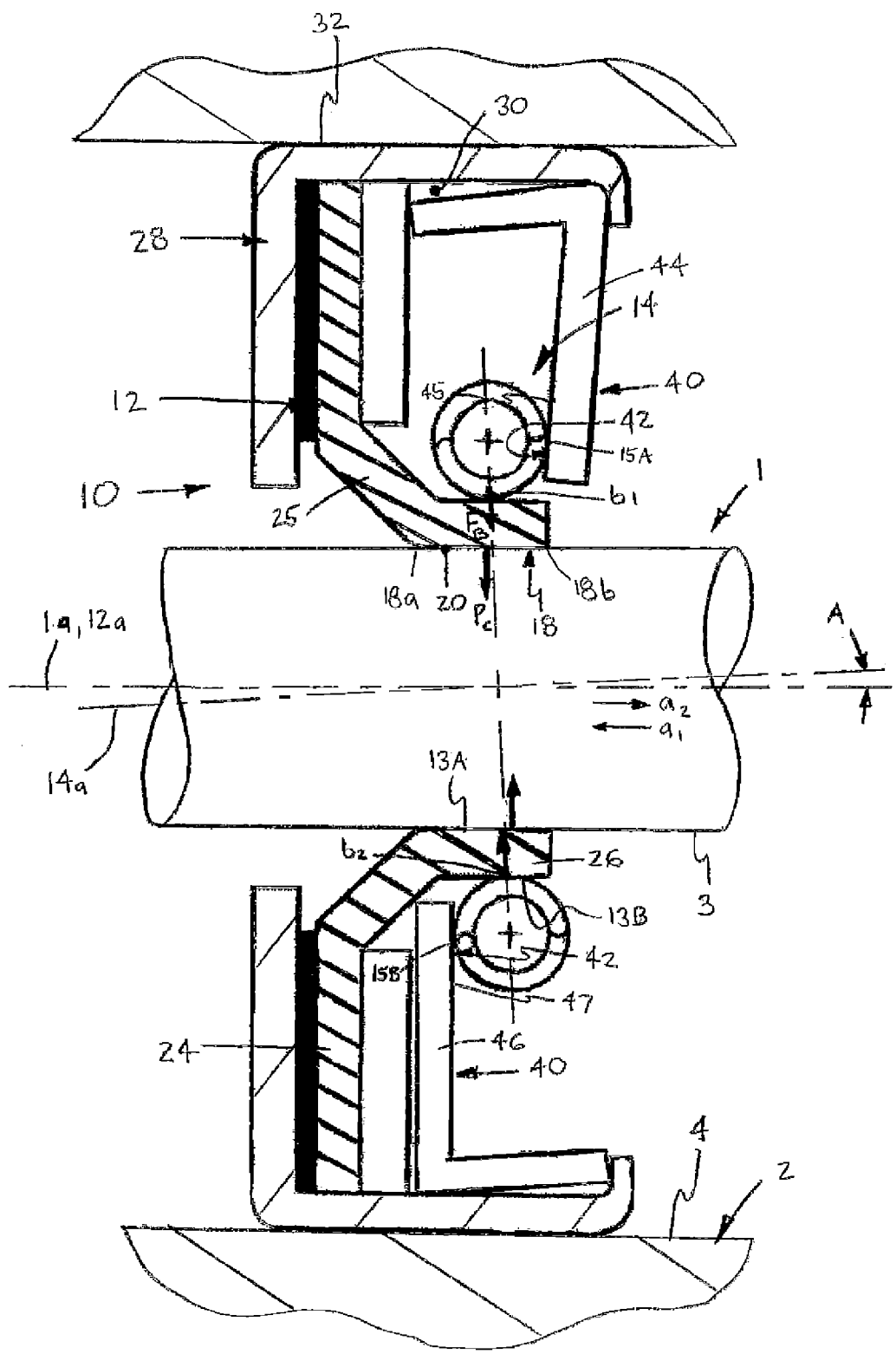
FIG. 1 is an axial cross-section of a seal assembly in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a seal assembly 10 for sealing a space S between a shaft 1 and a housing 2, the shaft 1 being rotatable about a central axis 1a. The seal assembly 10 basically comprises a seal body 12 and a generally annular biasing member 14 disposed about a portion of the seal body 12. The seal body 12 is connectable with the housing 2 and has a centerline 12a and inner and outer circumferential surfaces 13A, 13B extending about the centerline 12a, the inner surface 13A providing a sealing surface 18 and the outer surface 13B being engaged by the biasing member 14. The sealing surface 18 has opposing axial ends 18a, 18b and is slidably contactable with the shaft outer surface 3 so as to define a sealing interface 20. The biasing member 14 has a centerline 14a and is configured to exert a biasing force $F_B$ directed generally radially inwardly toward the centerline 14a. As such, when the biasing member 14 is mounted on the seal body 12, the biasing force $F_B$ causes the seal body 12 to exert a contact pressure $P_C$ on the shaft 1. Further, the biasing member 14 is angularly positioned on the seal body 12, i.e., the biasing member 14 is oriented or positioned such that the biasing member centerline 14a either intersects or is skewed with respect to the shaft axis 1a, thus defining an acute angle A between the centerline 14a and the axis 1a. As such, the contact pressure $P_C$ extends at least partially along the shaft axis 1a (i.e., axially) so as to direct a substance S (e.g., oil, debris particles, etc.) entering the sealing interface 20 toward a proximal one of the two axial ends 18a, 18b of the sealing surface 18 when the shaft 1 is rotating about the central axis 1a. Thus, the angled biasing member 14 functions to create a "pumping effect" that is particularly suitable for removing seepage fluid (e.g., oil) from the sealing interface 20.

More specifically, due to the fact that the biasing member 14 engages the seal body 12 about the entire circumferential perimeter of the body 12, the contact pressure $P_C$ generated by the angled biasing member 12 is exerted along a generally elliptical line or path $L_P$ extending circumferentially about the shaft axis 1a. The pressure path $L_P$ has a first point $E_1$ located most proximal to one of the two sealing surface ends 18a, 18b and a second point $E_2$ located most proximal to the other one of the two surface ends 18a, 18b. The first and second points $E_1$, $E_2$ are spaced apart both axially and circumferentially by about one hundred eighty degrees (180°) about the shaft axis 1a, and thus represent the axial limits or "end points" of the elliptical pressure path $L_P$. With this arrangement, a substance S located within the seal interface 20 at a point $p_1$ on the shaft outer surface 3 proximal to the sealing surface first end 18a is directed outwardly from the interface 20 generally in a first direction $a_1$ along the axis 1a as the shaft point $p_1$ displaces generally toward the first end point $E_1$ on the elliptical path $L_P$, as shown in FIGS. 4 and 5. Alternatively, a substance S located within the seal interface 20 at a point $p_2$ on the shaft outer surface 3, located proximal to the sealing surface second end 18b, is directed outwardly from the interface 20 generally in a second opposing direction $a_2$ along the axis 1a as the shaft point $p_2$ displaces generally toward the elliptical path second end point $E_2$, as depicted in FIG. 6.

Referring to FIGS. 3-6, the above-discussed mechanism for creating the pumping effect is now described in greater detail, with reference to a discrete substance S in order to facilitate discussion and illustration of the present invention. As discussed above, the elliptical pressure path $L_P$ generated by the angled biasing member 14 extends axially toward both ends 18a, 18b of the sealing surface 18 and divides the sealing interface 20 into a relatively higher pressure zone $Z_H$ at points generally along the pressure path $L_P$ and two relatively lower pressure zones $Z_{L1}$, $Z_{L2}$ at all other points within the sealing interface 20 on either side of the pressure path $L_P$. FIGS. 4A-4C depict a situation in which the shaft 1 is rotating in a first angular direction $r_1$ and a substance S enters the seal interface 20 at about a first point $p_1$ on the shaft outer surface 3 generally proximal to the first end 18a of the sealing surface 18 (e.g., adjacent the "air side" of the seal assembly 10). When moving through a first lower pressure zone $Z_{L1}$, the substance S remains generally axially stationary with respect to the shaft 1 and the seal body 12, as shown in FIG. 4A. However, as the shaft surface point $p_1$ moves into the higher pressure zone $Z_H$ along the elliptical pressure path $L_P$ (FIG. 4B), the orientation of the pressure path $L_P$ is such that the substance S tends displace axially from the first point $p_1$ and follow along a first quadrant $q_1$ of the path $L_P$ axially (in the first direction $a_1$) and radially toward the proximal (i.e., first) end 18a of the sealing surface 18 until the substance S is expelled from the sealing interface 20 (FIG. 4C). This is due to the pressure path first quadrant $q_1$ being generally aligned with the direction of shaft rotation $r_1$, such that after "contact" with the pressure path $L_P$, the momentum of the substance S on the rotating shaft 1 continues in the same angular direction $r_1$, but is also deflected or diverted axially outward toward the first end 18a by the higher contact pressure $P_C$ along the path $L_P$. If the substance S is not expelled during a first "pass" through the higher contact pressure zone $Z_H$, the substance S will first move through a section of a second lower pressure zone $Z_{L2}$, then "cut across" a single point on a second path quadrant $q_2$, which will not axially direct the substance due to the orientation of the path quadrant $q_2$ (i.e., angled away from the direction of rotation), and again move through the remainder of the first low pressure zone $Z_{L1}$ until passing through the first path quadrant $q_1$ (sequence not depicted). With reference to FIGS. 5A-5C, if the shaft 1 is instead rotating in a second, opposing direction $r_2$, a substance S at the first point $p_1$ on the shaft surface 3 will remain axially stationary while moving through the first lower pressure zone $Z_{L1}$, then become directed by higher pressure of the second path quadrant $q_2$ to displace axially and radially toward the sealing surface first end 18a until expulsion from the sealing interface 20.

Figure 6C:
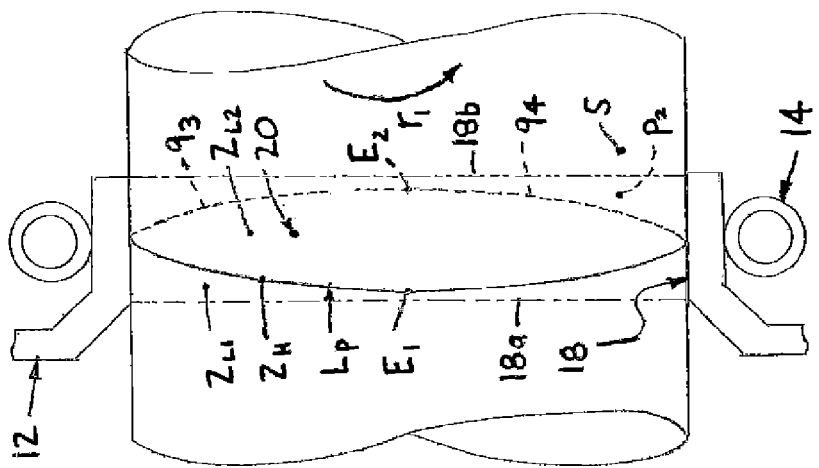
FIGS. 6A-6C, collectively
Figure 6B:
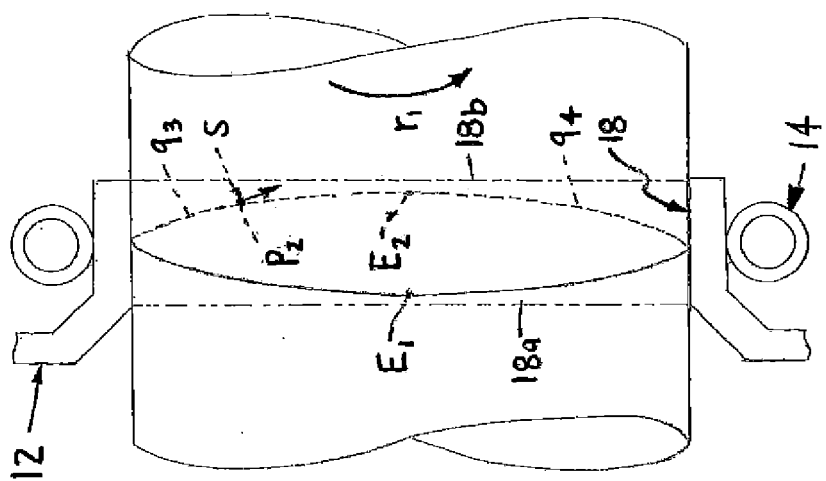
Figure 6A:
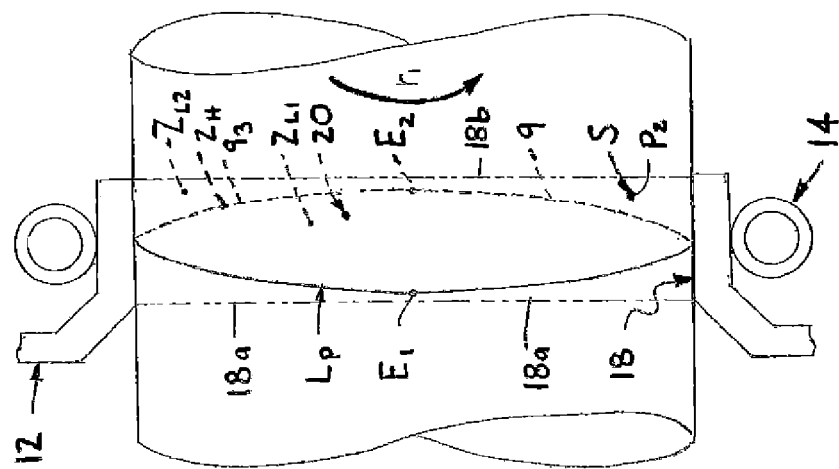

In a similar fashion, as shown in FIGS. 6A-6C, if a substance S instead enters the sealing interface 20 at a point $p_2$ on the shaft surface 3 generally proximal to the sealing surface second end 18b (e.g., adjacent to the "oil side" of the seal assembly 10), the substance S remains generally axially stationary until passing into either a third quadrant $q_3$ of the pressure path $L_P$ (if rotating in the first direction $r_1$, as depicted) or the second quadrant $q_4$ if the shaft 1 is rotating in the second direction $r_2$. Thereafter, the substance S is directed by either the pressure path third quadrant $q_3$ or fourth quadrant $q_4$ to displace axially in the second direction $a_2$ (and radially) until passing back across the sealing surface second end 18b, and thus out of the sealing interface 20. Although discussed and depicted with reference to a discrete substance S located at a specific point $p_1$ or $p_2$ on the shaft surface 3, the physical "pumping" mechanism operates the same on a substance dispersed upon an area of the shaft outer surface 3 or less discrete substances, and functions to expel both liquids and solids.

Figure 7:
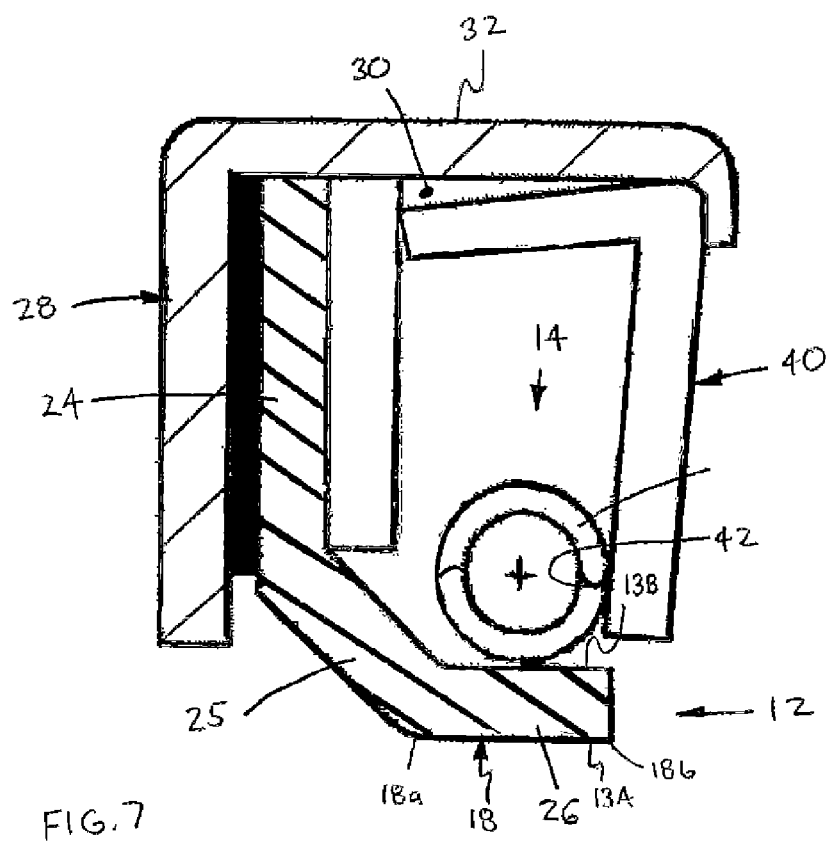
FIG. 7 is an enlarged, axial cross-sectional view of an upper end of the seal assembly.

Referring now to FIGS. 1 and 7, the seal assembly 10 is preferably a generally conventional PTFE radial shaft seal or Elastomeric wafer radial shaft seal adapted to include the inventive features described above and in further detail below. The seal body 12 is preferably formed of polytetrafluoroethylene (i.e., "PTFE") or an elastomeric material, but may be formed of any other appropriate material. Preferably, the seal body 12 includes a generally annular base portion 24 coupleable with the housing 2 and a generally annular cantilever portion 26 extending generally horizontally from the base portion 24 and providing the sealing surface 18. The cantilever portion 26 is connected with, and preferably integrally formed with, the base portion 24 and is deflectable relative to the base portion 24 about a hinge section 25. The biasing member 14 is configured to bias the seal body cantilever portion 26 generally radially inwardly about the hinge 25 such that the sealing surface 18 engages the shaft outer surface 3 with contact pressure $P_C$.

Further, the biasing member 14 is preferably a garter spring 22, but may alternatively be provided by any other appropriate component or device capable of exerting a radially-inwardly directed force on the seal body 12. For example, the biasing member 14 may be formed as a conventional O-ring, as a circular clip (e.g., a "cir-clip"), a generally circular ring, etc. Furthermore, as with such types of radial shaft seals, the seal assembly 10 preferably further comprises a generally annular casing 28 having an interior cavity 30 configured to receive the seal body 12, as discussed in further detail below, and an outer circumferential surface 32. The outer surface 32 is engageable with a housing inner circumferential surface 4 (FIG. 1) so as to mount the seal assembly 10 within the housing 2. Preferably, the casing 24 is formed of a metallic material, such as low carbon steel, but may be formed of another appropriate material, for example a rigid polymer.

Figure 2:
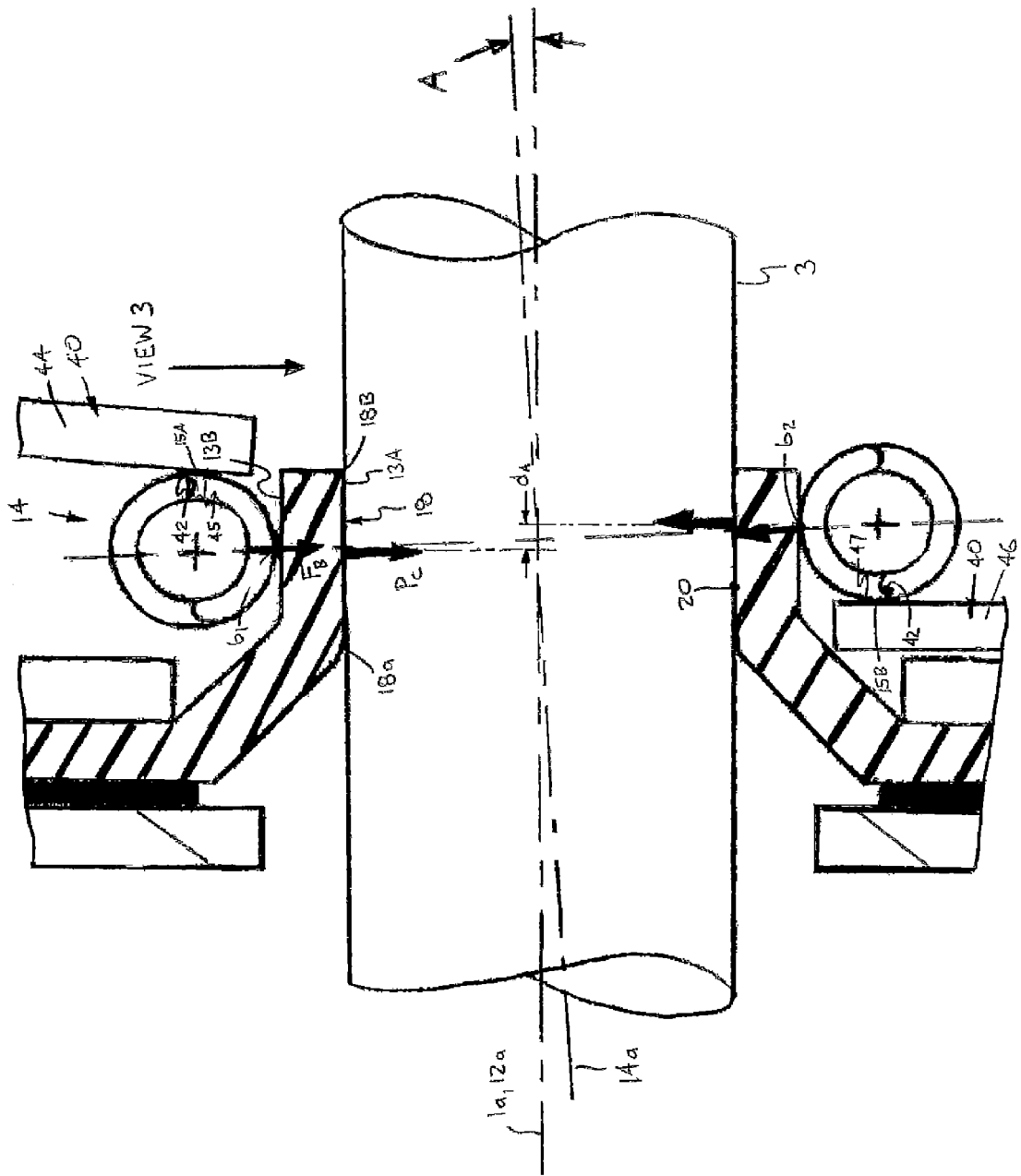
FIG. 2 is an enlarged view of a central portion of FIG. 1.
Figure 3:
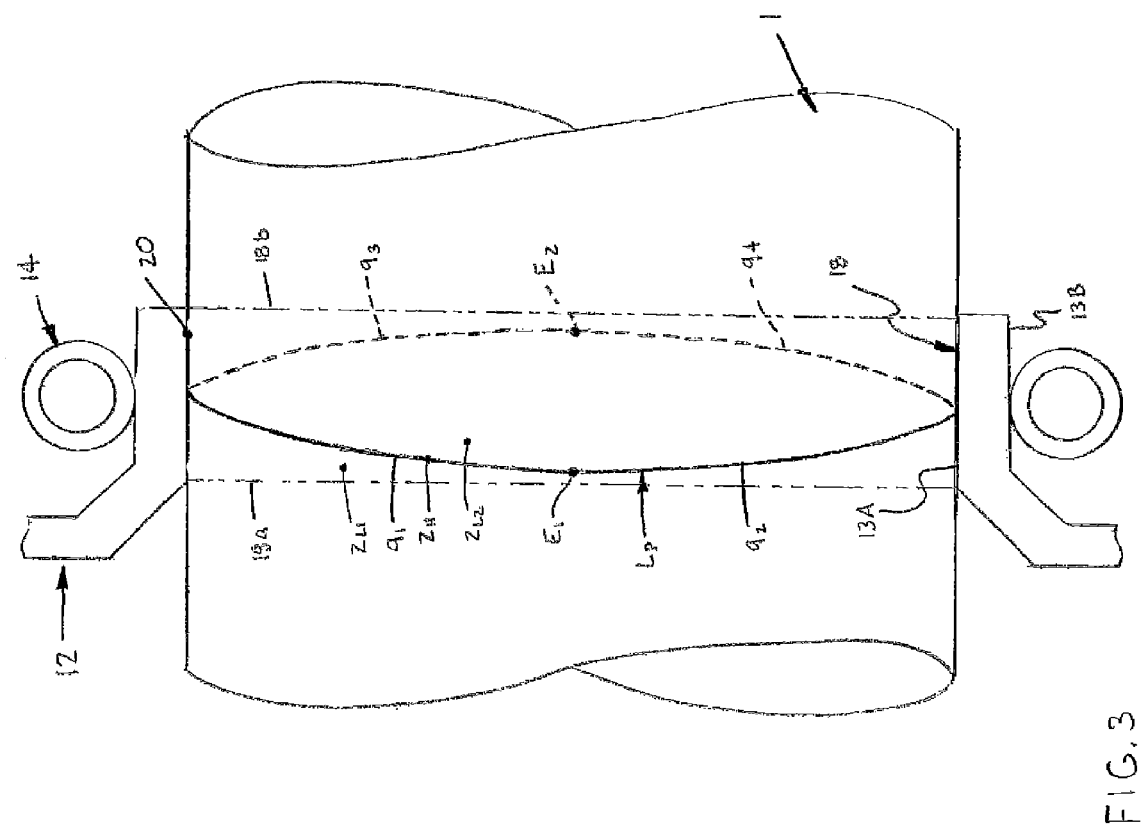
FIG. 3 is a top view of the seal assembly taken along the line "view 3" of FIG. 2, shown with an exaggerated angling of a biasing member to facilitate illustration of the invention.
Figure 5C:
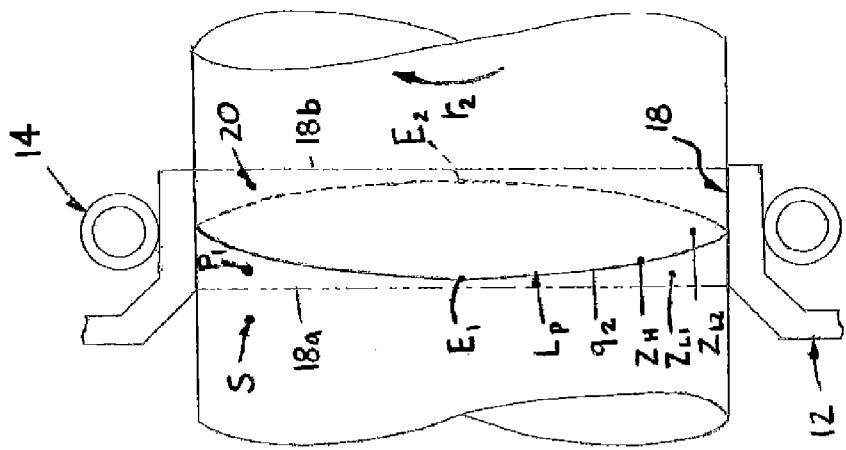
FIGS. 5A-5C, collectively
Figure 5B:
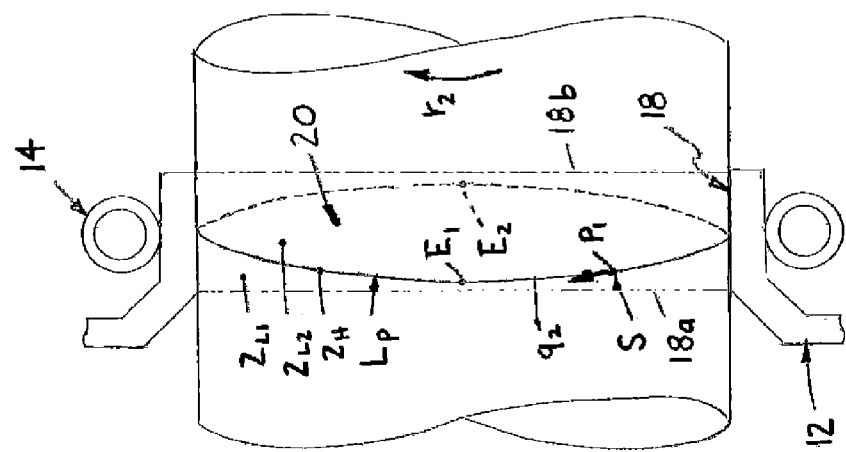
Figure 5A:
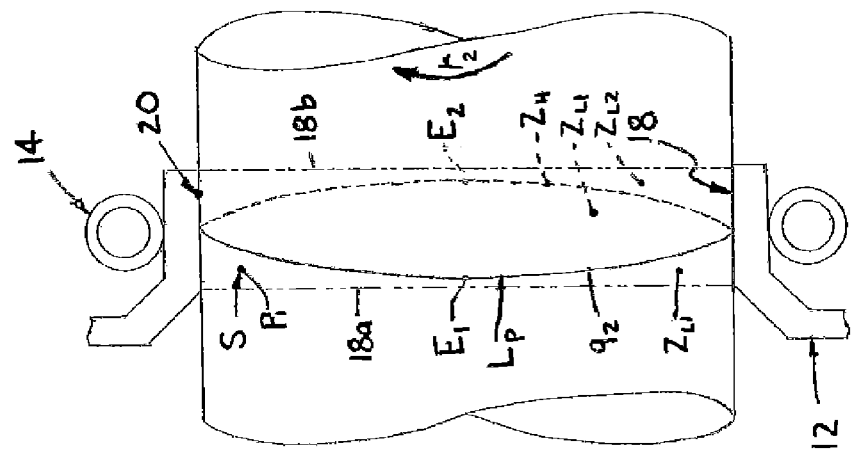

Referring to FIGS. 1, 2 and 7, in addition to the angled orientation of the biasing member 14 as described above, another primary difference between the seal assembly 10 and previously known radial seal assemblies is the inclusion of a "means" for positioning and/or retaining biasing member 14 in the angled orientation/position described above and depicted in the drawings. In a preferred construction, the seal assembly 10 further comprises at least one retainer 40 having a radial surface 42 contactable with the biasing member 14 and configured to angularly position the biasing member 14 on the seal body 12. Specifically, the retainer 40 contacts a portion of the biasing member 14 such that a first point $b_1$ on the biasing member 14 is spaced axially with respect to a second point $b_2$ on the biasing member 14 by a distance $d_A$ (FIG. 2), the first and second points $b_1$, $b_2$ being spaced apart circumferentially about the biasing member centerline 14a (and shaft centerline 1a) by about one hundred eighty degrees (180°). The two points $b_1$, $b_2$ represent the axial "ends" of the biasing member 14; in other words, the points spaced furthest apart along the shaft axis 1a.

Preferably, the seal assembly 10 includes at least one first retainer member 44 having a first radial surface 45 facing generally in the first direction $a_1$ along the shaft axis 12a and a second retainer member 46 having a second radial surface 47 facing generally in the second, opposing direction $a_2$ along the shaft axis 1a. The two retainer members 44, 46 are spaced apart by about one hundred eighty degrees (180°) about the seal member centerline 12a, and each of the first and second radial surfaces 45, 47 are contactable with an opposing radial surface 15A, 15B, respectively, of the biasing member 14 (see FIG. 2). More specifically, each retainer 44, 46 contacts the biasing member 14 proximal to a separate one of the end points $b_1$, $b_2$ and prevents the biasing member 14 from "shifting" or otherwise displacing axially into a radial alignment (i.e., a non-angled orientation). Further, the two retainer members 44, 46 may be formed in any appropriate manner, such as for example, generally rectangular or arcuate tabs/bars connected with, or merely retained by, the casing 28.

Figure 8:
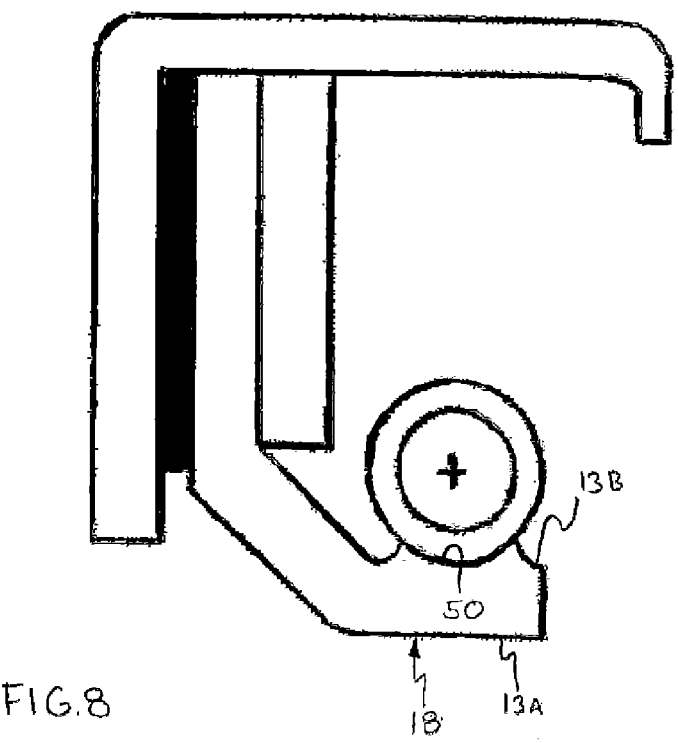
FIG. 8 is an enlarged, axial cross-sectional view of the upper end of the seal assembly, showing an alternative construction of the seal body with a circumferential groove and without retainer members.

Alternatively, the seal body 12 itself may be provided with the means for positioning and retaining the biasing member 14 in the above-described angled orientation. For example, the seal body 12 may be formed or provided with an elliptical groove 50 extending radially inwardly from the seal member outer surface 13B and circumferentially about the seal member centerline 12a, as depicted in FIG. 8. The groove 50 may be configured to receive at least a portion of the biasing member 14 such that the first point $b_1$ on the biasing member 14 is spaced axially with respect to the second point $b_2$ on the biasing member 14 (i.e., by distance $d_A$), the first and second points $b_1$, $b_2$ being spaced apart by about one hundred eighty degrees (180°). As a further example, the seal body 12 may be formed with at least one and preferably two integral retainer members (none shown) extending generally radially outwardly from the body outer surface 13B and formed to function substantially as discussed above with the retainer members 44, 46.

Referring to FIGS. 1, 4 and 6, in use, the pumping seal assembly 10 of the present invention is assembled and operates basically as follows. The seal body 12 is mounted on the shaft 2 and the biasing member 14 is mounted about the cantilever portion 26 of the seal body 12 so as to be angularly positioned as described above, causing the seal body 12 to exert contact pressure $P_C$ circumferentially about the shaft outer surface 3 due to the radially inward directed force $F_B$ of the annular biasing member 14. The elliptical pressure path $L_P$ thus generated by the angularly positioned biasing member 14 extends axially toward each end of the sealing surface 18a, 18b, as described in detail above. Thereafter, as the shaft 1 rotates within the seal body 12, the contact pressure $P_C$ directs any substance entering the sealing interface toward a proximal one of the two axial ends 18a, 18b of the sealing surface 18, as depicted in FIGS. 4-6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for sealing a space between a shaft and a housing, the shaft being rotatable about a central axis, the seal assembly comprising:

a seal body connectable with the housing and having a centerline and a generally circular cylindrical inner circumferential sealing surface extending about the centerline, the sealing surface having a length between opposing axial ends and being slidably contactable with the shaft outer surface so as to define a sealing interface; and a generally annular biasing member disposed about a portion of the seal body and having a centerline and an axial length that is lesser than the length of the sealing surface, the biasing member being configured to exert a biasing force directed generally radially inwardly toward the centerline such that the seal body exerts a contact pressure on the shaft, the biasing member being angularly positioned on the seal body so as to generally lie within a plane extending non-perpendicularly through the sealing surface such that the contact pressure extends at least partially axially along the shaft axis so as to direct a substance entering the sealing interface toward a proximal one of the two axial ends of the sealing surface when the shaft rotates about the central axis.

2. The seal assembly as recited in claim 1 wherein the biasing member is positioned on the seal body such that the biasing member centerline one of intersects the shaft axis and is substantially skewed with respect to the shaft axis.

3. The seal assembly as recited in claim 1 wherein the biasing member engages the seal body such that the contact pressure is exerted along a generally elliptical path extending circumferentially about the shaft axis, the pressure path having a first point located most proximal to one of the two sealing surface ends and a second point located most proximal to the other one of the two surface ends, the first and second points being spaced apart by about one hundred eighty degrees about the shaft axis.

4. The seal as recited in claim 3 wherein:
a substance located within the seal interface at a point on the shaft outer surface generally proximal to the sealing surface first end is directed outwardly from the interface generally in a first direction along the axis as the shaft point displaces generally toward the first point on the elliptical path; and
a substance located within the seal interface at a point on the shaft outer surface generally proximal to the sealing surface second end is directed outwardly from the interface generally in a second opposing direction along the axis as the shaft point displaces generally toward the second point on the elliptical path.

5. The seal as recited in claim 1 wherein the seal body has inner and outer circumferential surfaces, the inner surface providing the sealing surface and the biasing member being engaged with the outer surface, and one of:
the seal further comprises at least one retainer configured to angularly position the biasing member with respect to the seal body; and
the seal body outer surface is configured to angularly position the biasing member with respect to the seal body.

6. The seal assembly as recited in claim 5 wherein the at least one retainer has a radial surface contactable with the biasing member and configured to position the biasing member on the seal body such that a first point on the biasing member is spaced axially with respect to a second point on the biasing member, the first and second points being spaced apart about the biasing member centerline by about one hundred eighty degrees.

7. The seal as recited in claim 6 wherein the at least one retainer includes a first retainer member having a first radial surface facing generally in a first direction along the shaft axis and a second retainer member having a radial surface facing generally in a second, opposing direction along the shaft axis, the two retainer members being spaced about one hundred eighty degrees apart about the seal member centerline and each of the first and second radial surfaces being contactable with an opposing radial surface of the biasing member.

8. The seal assembly as recited in claim 5 wherein the seal member has a generally elliptical groove extending radially inwardly from the seal member outer surface and circumferentially about the seal member centerline, the groove being configured to receive at least a portion of the biasing member such that a first point on the biasing member is spaced axially with respect to a second point on the biasing member, the first and second points being spaced apart by about one hundred eighty degrees.

9. The seal assembly as recited in claim 1 wherein the seal body includes a base portion coupleable with the housing and cantilever portion connected with the base portion and providing the sealing surface, the cantilever portion being deflectable relative to the base portion and the biasing member being configured to bias the cantilever portion generally radially inwardly such that the sealing surface engages the shaft outer surface.

10. The seal assembly as recited in claim 9 further comprising a generally annular casing having an interior cavity configured to receive the seal member base portion and an outer circumferential surface engageable with an inner circumferential surface of the housing so as to mount the seal assembly within the housing.

11. The seal assembly as recited in claim 1 wherein the biasing member is a garter spring.

12. A method of pumping fluid with a seal assembly for sealing a space between a rotatable shaft and a housing, the pumping method comprising the steps of:
providing a seal assembly including a generally annular seal body and a generally annular biasing member, the seal body having a centerline and a generally circular cylindrical inner circumferential sealing surface extending about the centerline, the sealing surface having a length between opposing axial ends, the biasing member having a centerline and an axial length that is lesser than the length of the sealing surface and being configured to exert a biasing force radially inwardly toward the centerline;
mounting the seal body about the shaft such that the sealing surface is engaged with an outer circumferential surface of the shaft so as to define a sealing interface;
mounting the biasing member about a portion of the seal body such that the biasing member is angularly positioned on the body so as to generally lie within a plane extending non-perpendicularly through the sealing surface, the biasing member exerting the biasing force on the seal body such that the seal body exerts a contact pressure on the shaft, the contact pressure extending at least partially along the shaft axis; and
rotating the shaft within the seal such that the contact pressure directs any fluid entering the sealing interface toward a proximal one of the two axial ends of the sealing surface 13. The pumping method as recited in claim 12 wherein the step of mounting the biasing member includes positioning the biasing member with respect to the seal body such that the contact pressure is exerted along a generally elliptical path extending circumferentially about the shaft axis, the pressure path having a first point located most proximal to one of the two sealing surface ends and a second point located most proximal to the other one of the two surface ends, the first and second points being spaced apart about one hundred eighty degrees about the shaft axis.

14. The pumping method as recited in claim 13 wherein:
fluid located within the seal interface at a point on the shaft outer surface proximal to the sealing surface first end is directed outwardly from the interface generally in a first direction along the axis as the shaft point displaces generally toward the first point on the elliptical path; and
fluid located within the seal interface at a point on the shaft outer surface proximal to the sealing surface second end is directed outwardly from the interface generally in a second opposing direction along the axis as the shaft point displaces generally toward the second point on the elliptical path.

* * * * *